United States Patent [19]

Kawasaki et al.

[11] 4,328,337
[45] May 4, 1982

[54] HIGH POLYMERIC COMPOUNDS HAVING SACCHARIDE SIDE CHAINS

[75] Inventors: Takao Kawasaki, Sayama; Yoshiaki Osaka, Nagareyama; Yukiharu Yamaguchi, Hino; Saichi Ono, Tokyo, all of Japan

[73] Assignee: Kureha Kagaku Kogyo Kabushiki Kaisha, Tokyo, Japan

[21] Appl. No.: 105,653

[22] Filed: Dec. 20, 1979

[30] Foreign Application Priority Data

Dec. 29, 1978 [JP] Japan .................................. 53-161387

[51] Int. Cl.³ ...................... C07H 13/02; C07H 11/00
[52] U.S. Cl. .................................... 536/119; 536/115; 536/116; 424/180
[58] Field of Search ........................ 536/115, 116, 119

[56] References Cited

U.S. PATENT DOCUMENTS 3,103,508  9/1963  Fisher et al. ...................... 536/119
3,542,908  11/1970  Sharples et al. .................. 536/119

OTHER PUBLICATIONS

Hochmol. Ber. 1981, H5747/71 Vysokomol. Soed. 12(1970), Serie B No. 11.
Makromol. Chem. 179(1978), 1117 to 1120.
J. Polymer Sci., Polymer Letters, vol. 13.

Primary Examiner—Johnnie R. Brown
Attorney, Agent, or Firm—Wegner & Bretschneider

[57] ABSTRACT

Disclosed are novel high polymeric substances having saccharide side chains, suitable as a high polymeric material having several functions for medical treatments and a method for producing thereof.

1 Claim, 2 Drawing Figures

HIGH POLYMERIC COMPOUNDS HAVING SACCHARIDE SIDE CHAINS

SUMMARY OF THE INVENTION

The present invention relates to novel high polymeric substances having saccharide residues on their side chains, represented by the general formula:

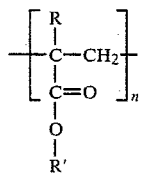
(I)

wherein R represents a hydrogen atom or methyl group, R' represents a saccharide residue acyl-bonded with its 1-position and n is an integer of 10 to 1,000.

The present invention also relates to a novel method for producing the above-mentioned high polymeric substances.

Since the high polymeric substances represented by the above-mentioned general formula are excellent in hydrophilia and bio-adaptability and have membrane-forming property, and show a high polymeric hydrogellic state rich in water-retaining property after being cross-linked, they are useful as a high polymeric material for medical treatments such as an ointment of drugs for dermal diseases, artificial eye lens and artificial synovia.

BACKGROUND OF THE INVENTION

Originally, cells and membranes of living bodies are consisted of glycolipids, and accordingly the glycolipids present rich in amount on cellular surface and intercellular spaces and have a function of maintaining the intercellular bonding ability and the water-retaining ability of intercellular liquid by the hydrogen bond of the hydroxyl groups of the saccharide residue.

From the above-mentioned viewpoint, several applications are expected on the high polymeric substances having saccharide residues on their side chains and having a similar constitution to the glycolipids constituting the cells on account of their excellent hydrophilia and bio-adaptability as a high polymeric material having several functions for medical treatment.

However, the reports on the synthesis of high polymeric substances having saccharide residues on their side chains are unexpectedly small in number except for a report of Nishio et al. (Preliminary texts for XXIV Annual Meeting of High Polymer Soc. Japan, page 197 (1975) and that of Black et al. (J. Chem. Soc., 4433 (1963).

In the report by Nishio, a method for producing the compounds represented by the following formula (A) is disclosed:

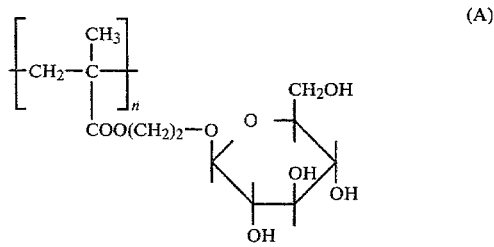

wherein acetobromoglucose is bonded by Köning's reaction to 2-hydroxyethyl methacrylate and the thus obtained monomer is polymerized and then the polymer is de-acetylated to obtain the high polymeric substance in which 1-position of the saccharide residue has an ether bonding to the main chain of the methacrylate.

On the other hand, Black et al. reported poly(3-O-methacroyl-D-glucose) represented by the following formula (B):

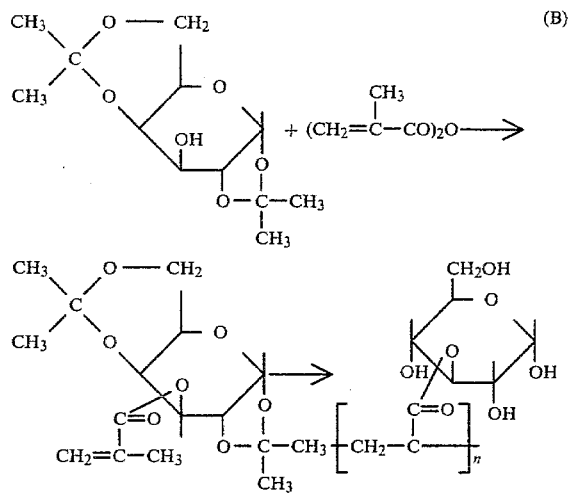

obtained by at first acylating the hydroxyl group of 3-position of 1,2,5,6-diisopropylideneglucose, polymerizing the thus obtained monomer and de-acetylating the thus obtained polymer following the reaction formulae shown above.

Although the method of Nishio utilizes the König's reaction which is a conventional method of synthesizing a sugar ether for obtaining his monomer, it is said to be a laboratory-wise method from the view point of yield of the reaction.

On the other hand, the method of Black et al. is to obtain a high polymeric substance in which 3-position of the saccharide residue is acyl-bonded to the main chain and in this case, a selective protection of the other hydroxyl group is necessary. However, the protection of hydroxyl groups of the sugar is impossible in disaccharides and trisaccharides even if it is easily performed in a monosaccharide. Accordingly, the method of Black et al. cannot afford to give a high polymeric substance in which 3-position of polysaccharide residue is bonded to the side chain of the high polymer.

The present inventor from the consideration of the above-mentioned technical background and of the fact that the physical properties and the functions of the high polymeric substance having saccharide-bonded side chains in living bodies are variable corresponding to the kinds of saccharide and the position of bonding or the degree of polymerization, has tried to synthesize a high polymeric substance having a novel saccharide-bonded side chains. As a result the inventor has been successful in providing a novel high polymeric substance excellent in bio-adaptability.

The inventor could furnish high polymeric substances having saccharide molecules of various chain length in side chain by a sequence of reactions as follows:

At first, acrylic acid, methacrylic acid or one of their metal salts is made to react with a compound of sugar in which 1-position is activated by halogenation or ortho-esterification and other hydroxyl groups are acylated to obtain a monomeric sugar acrylate or sugar methacrylate in which 1-position of the sugar is acrylated or methacrylated. Then the monomeric ester is polymerized and the polymer is de-acrylated by sodium methylate, ammonia, etc. Or, at first, a polymer of acrylic acid or methacrylic acid is made to react with a sugar having its 1-position selectively activated and then the product is de-acylated to obtain the end product.

DETAILED DESCRIPTION OF THE INVENTION

Figure 1:
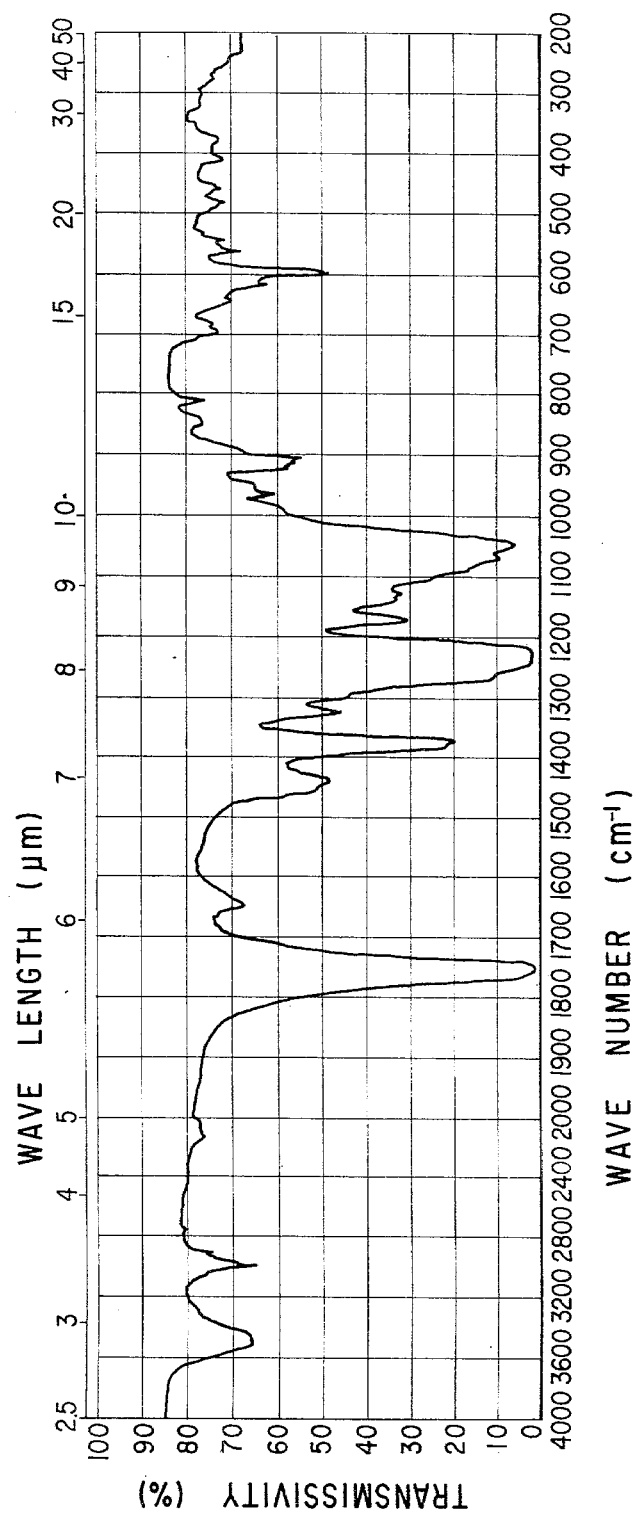
FIG. 1 of the drawings show an infrared absorption spectrum of 1-O-methacroyl-2′,3′,6′,2,3,4,6-hepta-O-acetyl-D-cellobiose, one example of monomers from which the high polymeric substance having saccharide side chain of the present invention is obtained and FIG. 2 show an infrared absorption spectrum of poly(1-O-methacroyl-D-cellobiose) which is an example of the high polymeric substances of the present invention, obtained by polymerizing the monomeric compound shown above.

The high polymeric substance having saccharide in its side chain of the present invention is represented by the following general formula (I):

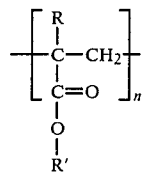

(I)

wherein R represents a hydrogen atom or a methyl group, R′ represents a saccharide residue acyl-bonded with its 1-position and n is an integer of 10 to 1,000. The above-mentioned saccharide residue includes a glucose-, a fructose-, a maltose-, a mannose-, a lactose- and a cellobiose residue.

The high polymeric substances having saccharide residue in its side chains represented by the general formula (I) have a degree of polymerization of 10 to 1,000, preferably of 20 to 500, and the bonding type on the terminal of saccharide side chain may be alpha or beta, not being particularly restricted. Also the high polymeric substance of the present invention may have polysaccharide side chains each of them having a reducing terminal part in structure such as maltohexaose and maltopentaose.

The high polymeric substances having saccharide side chains include the following embodiments:

Poly(1-O-methacroyl-D-glucose),
Poly(1-O-acroyl-D-glucose),
Poly(1-O-methacroyl-D-fructose),
Poly(1-O-acroyl-D-fructose),
Poly(1-O-methacroyl-D-maltose),
Poly(1-O-acroyl-D-maltose),
Poly(1-O-methacroyl-D-mannose),
Poly(1-O-acroyl-D-mannose),
Poly(1-O-methacroyl-D-lactose),
Poly(1-O-acroyl-D-lactose),
Poly(1-O-methacroyl-D-cellobiose) and
Poly(1-O-acroyl-D-cellobiose).

The above-mentioned high polymeric substance of the present invention is readily soluble in water and has a favorable membrane-forming property and after cross-linking by use of, for instance, formaldehyde, the product forms a hydrogel rich in water-content, in other words, of an excellent water-retaining property.

Accordingly, the high polymeric substance of the present invention, when applied in a state of an aqueous solution together with drugs for several dermal diseases on the skin, is able to maintain the effectiveness of the drug, and the substance of the present invention is applicable in its state of hydrogel as artificial eye lens and artificial synovia.

Moreover, the high polymeric substances of the present invention are possibly applicable to artificial blood vessel, etc. by completely or partially acylating the present high polymeric substance, processing it to any articles with desired shape after compounding with or without any suitable resin and then treating the article with a de-acylating agent such as sodium methylate or ammonia thereby forming a hydrophilic membrane layer on the shaped article.

By the way, the toxicity of the high polymeric substance of the present invention to mammals is extremely low, for instance, in the case where it was administered to mice at a dose rate of 2 g/kg body weight in a state of an aqueous solution no death of the animal was observed.

The followings are the explanations of the method of synthesis of the high polymeric substance having saccharide side chains of the present invention. There are two methods of synthesis as follows:

(1) Synthesis from a monomeric compound:

The monomeric compound is obtained by bringing methacrylic acid, acrylic acid or one of their metal salts into reaction with a compound obtained by halogenating or orthoesterifying the terminal hydroxyl group(s) of the corresponding saccharide in an inert solvent such as chloroform, benzene, ethyl acetate, etc. at a temperature of 10° to 200° C., preferably of 20° to 40° C. for 3 to 72 hours, other hydroxyl groups of the saccharide having been acylated in advance. The synthesis of the monomer is as follows:

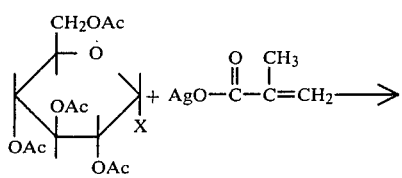

(i)

(wherein X is Cl or Br)

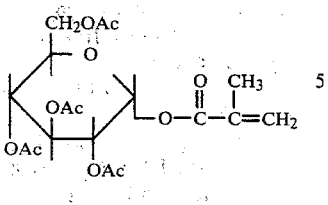

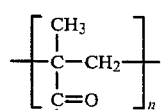

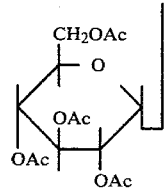

Besides, the compounds obtained by halogenizing or orthoesterifying the reducing terminal part of fructose, maltose, mannose, lactose, cellobiose, etc. are used in the above-mentioned method of synthesis to give monomeric compounds having the corresponding saccharide side chain.

Purification of the synthesized monomeric compound may be performed by the publicly known methods. For instance, after the above-mentioned synthesis is over, the obtained monomer is brought into a solution in ethyl acetate and the solution is treated with activated carbon and then subjected to re-precipitation with n-hexane, etc. to be the purified monomer. The identification of the monomeric compound can be performed by elementary analysis, infrared spectroscopic analysis and nuclear magnetic resonance analysis, etc.

In the next place, polymerization of the above-mentioned monomeric compound is carried out in an inert solvent such as benzene, chloroform, ethyl acetate, dimethylformamide and dioxane in the presence of a conventional initiator for radical polymerization such as azobisisobutyronitrile and lauroyl peroxide at a temperature of 10° to 200° C., preferably of 30° to 100° C. for 5 to 20 hours. For instance, 1-O-methacroyl-2,3,4,6-tetraacetylglucose is polymerized to give the polymeric product as is shown below.

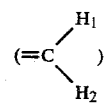

The polymeric product obtained as shown above is deacetylated in alcohol by using a de-acetylating agent such as sodium methylate and ammonia at a temperature lower than the room temperature to obtain the high polymeric substance having the corresponding saccharide side chains.

(2) Synthesis by bonding saccharide side chains to the main chain of the polymeric substance:

Polymer of acrylic acid or methacrylic acid is dissolved or dispersed as a suspension in a solvent such as benzene, chloroform, dimethylformamide, etc. and a compound obtained by orthoesterifying the hydroxyl groups of the terminal reducing part of the corresponding saccharide is added to the mixture at a temperature of 10° to 200° C., preferably of 30° to 100° C. and kept for 1 to 5 hours at this temperature and then the final mixture is treated by a de-acetylation agent to obtain the high polymeric substance of the object. According to this method, it is not necessary to selectively protect the hydroxyl groups of the saccharide and the high polymeric substance having polysaccharide as the side chains is possibly synthesized at a high yield.

The object substances obtained by the above-mentioned methods (1) and (2) are possibly identified by elementary analysis, infrared absorption spectroscopy and nuclear magnetic resonance analysis. That is, from the information of the disappearance of the terminal vinyl (C=C stretching vibration) absorption in infrared absorption spectrum and of the disappearance of the terminal group $$\left(=C\diagup_{H_2}^{H_1}\right)$$

specific resonance in nuclear magnetic resonance spectrum, it is known that the substance is a polymer.

The average molecular weight of the obtained high polymeric substance is determined based on the intrinsic viscosity of the substance in an aqueous solution of the polymer at 30.2° C. by calculating according to the following formula:

$$[\eta] = 0.2 \times 10^{-4} \overline{M}^{1.2}$$

wherein $[\eta]$ is obtained by the Ubberhode viscometer and $\overline{M}$ is the viscosity-averaged molecular weight.

The high polymeric substance having saccharide side chain of the present invention has a degree of polymerization (n) of 10 to 1,000, preferably 20 to 500, and is readily soluble in water as has been described before no matter what is the saccharide side chain and the kind of the main chain, and also it is high in water-retaining property and excellent in membrane-forming ability.

The use of the high polymeric substance of the present invention as a component of drugs for dermal diseases, artificial eye lens and artificial synovia after cross-linking utilizing its specific property has been already described. Moreover, the specific application for artificial blood vessel after acetylation, shaping and de-acetylation has been described before.

The followings are the examples of synthesis and of application of the high polymeric substance of the present invention as a material for medical treatments:

EXAMPLE 1

(a) Synthesis of 1-O-methacroyl-2,3,4,6-tetraacetyl-glucose. 3,4,6-tri-O-acetyl-α-glucose 1,2-ethylorthoacetate (3.76 g), methacrylic acid (0.86 g) and butylhydroxytoluene (0.010 g) were dissolved in 60 ml of monochlorobenzene and the solution was stirred for 30 minutes at a temperature of 90° C., and after distilling off the chlorobenzene under reduced pressure, methanol was added to the syrupy residue and the thus separated white precipitate was collected by filtration. After dissolving the precipitate into ethyl acetate and treating with activated carbon, n-hexane was slowly added to the solution to separate the product, which was collected by filtration and dried to obtain 3.83 g (corresponding to the yield of 83%) of colorless crystals melting at 194°–195° C. The carbon- and hydrogen contents of the product were respectively 51.0% by weight and 5.8% by weight according to the elementary analysis, which coincided well with those 1-O-methacroyl-2,3,4,6-tetraacetylglucose.

(b) Production of poly(1-O-methacroyl-D-glucose).

In 50 ml of dimethylformamide, 20.8 g of the above-mentioned 1-O-methacroyl-2,3,4,6-tetraacetylglucose was dissolved, and 10 mg of azobisisobutyronitrile was added to the solution. The mixture was heated for 12 hours at a temperature of 65° C. under a flow of gaseous nitrogen. After the reaction is over, 50 ml of dimethylformamide was added to the reaction mixture and the final mixture was poured into 500 ml of methanol. The thus separated white precipitate was collected by filtration, washed with methanol and dried under reduced pressure to obtain 17.7 g of white powdery product (yield of 85.0% by weight).

Then, after pulverizing 15 g of this white powdery product it was suspended in 110 ml of methanol, and 40 ml of 1.6% by weight methanolic solution of sodium methylate was added to the solution, and the mixture was agitated for 4 hours at the room temperature. After the reaction was over, 200 ml of water was added to the reaction mixture followed by neutralization with an aqueous dilute solution of hydrochloric acid. The neutralized solution was dialised for 90 hours in a dialysis tube (DC-210, made by Union Carbide Co.). Then the content of the tube was condensed to about 30 ml and 300 ml of methanol was admixed with the condensate.

The thus deposited white precipitate was separated by centrifugation, washed several times with methanol and dried under reduced pressure to obtain 6.53 g of white powder (yield of 73% by weight), which did not show a definite melting point. The results of elementary analysis of the product were:

Found: Carbon 48.4% by weight and Hydrogen 6.1% by weight Calcd.: Carbon 48.6% by weight and Hydrogen 6.1% by weight The degree of polymerization of the product was 4.2 in intrinsic viscosity of $[\eta]$.

The results of infrared spectroscopy were:
(i) at 3400 cm$^{-1}$,
  broad band of OH-stretching of saccharide,
(ii) at 2900 cm$^{-1}$,
  belong to $\nu_{asym}(CH_3)$ of methacrylic acid to $\nu_s(CH_2)$ of 6-position of saccharide, to $\nu(CH)$ of saccharide ring,
(iii) at 1730 cm$^{-1}$,
  belong to stretching of C=O of poly(methacrylate ester), and
(iv) at 1260 and 1100 to 1000 cm$^{-1}$,
  broad bands not identified.

Moreover, by the determination of H'-nuclear magnetic resonance spectroscopy, absorptions of $(CH_3)$ of poly(methacrylic acid) at $\delta=1.0$ ppm, of $(CH_2)$ of poly(methacrylic acid) at $\delta=2.0$ ppm, and $H_{1\beta}$ of ester bonding between OH of 1-position of saccharide and methacrylic acid at $\delta=5.46$ ppm were observed.

According to the above-mentioned analyses, the white powder obtained by the procedures in Example 1 was identified as poly(1-O-methacroyl-D-glucose). In addition, this product dissolved in water substantially infinitely and was soluble in dimethylformamide and dimethylsulfoxide, however was not soluble in ordinary organic solvents.

EXAMPLE 2

(a) Synthesis of 1-O-methacroyl-2',3',6',2,3,4,6-hepta-O-acetyl-D-cellobiose.

Acetobromocellobiose (110 g) was dissolved in 1.5 liters of anhydrous chloroform and after adding 40.4 g of silver methacrylate to the solution the mixture was stirred for 72 hours at the room temperature.

After the reaction was over, the deposited precipitate was separated by filtration and the filtrate was condensed and dried to be a solid. The solid was dissolved in 700 ml of ethyl acetate, and 1000 ml of n-hexane were slowly added to the solution. The thus deposited white precipitate was collected by filtration and repeatedly purified with ethyl acetate and n-hexane to obtain 86.6 g (yield of 77.3% by weight) of colorless crystals melting at 189° to 191° C. The results of elementary analysis of the product were:

Found: Carbon of 50.6% and Hydrogen of 5.7% by weight, Calcd: Carbon of 51.1% and Hydrogen of 5.7% by weight The results of infrared absorption spectroscopy were: absorption peaks of, as shown in FIG. 1, 2962, 2872, 1750, 1640, 1435, 1370 1320, 1260, 1240, 1170, 1140, 1125, 1105, 1090–1045, 1030, 967, 920, 905 and 850–840 cm$^{-1}$.

According to the results shown above, the colorless powdery product was identified as 1-O-methacroyl-2',3',6',2,3,4,6-heptaacetylcellobiose.

(b) Production of poly(1-O-methacroyl-D-cellobiose):

Fifteen grams of 1-O-methacroyl-2',3',6',2,3,4,6-heptaacetylcellobiose were dissolved in 30 ml of dimethylformamide and after addition of 15 mg of azobisisobutyronitrile to the solution, the mixture was stirred for 16.5 hours at a temperature of 70° C. under a flow of gaseous nitrogen.

After the polymerization was over, 50 ml of dimethylformamide was added to the reaction mixture and the final mixture was poured into 500 ml of methanol. The thus deposited white precipitate was collected by filtration, washed with methanol and dried under reduced pressure to obtain 12.2 g (yield of 81.3% by weight) of the product. After pulverizing and suspending 12.0 g of the product in 100 ml of methanol, 40 ml of 1.6% by weight methanolic solution of sodium methylate were added to the suspension, the mixture being agitated for 4 hours at the room temperature.

After the reaction was over, 200 ml of water were added to the reaction mixture just followed by neutralization with an aqueous dilute hydrochloric acid. The neutralizate was dialized for 90 hours in a dialysis tube (DC-210, made by Union Carbide Co.). Then the content of the tube was condensed to about 30 ml and 300 ml of methanol were added to the condensate to obtain a deposited white precipitate. The precipitate was collected by centrifugation, washed five times with methanol and dried under reduced pressure to obtain 5.3 g of white powder (yield of 75% by weight), which showed no definite melting point. Its degree of polymerization was 5.5 in intrinsic viscosity. The results of elementary analysis of the product were:

Found: Carbon of 46.5% by weight and Hydrogen of 6.1% by weight, Calcd: Carbon of 46.9% by weight and Hydrogen of 6.1% by weight.

Figure 2:
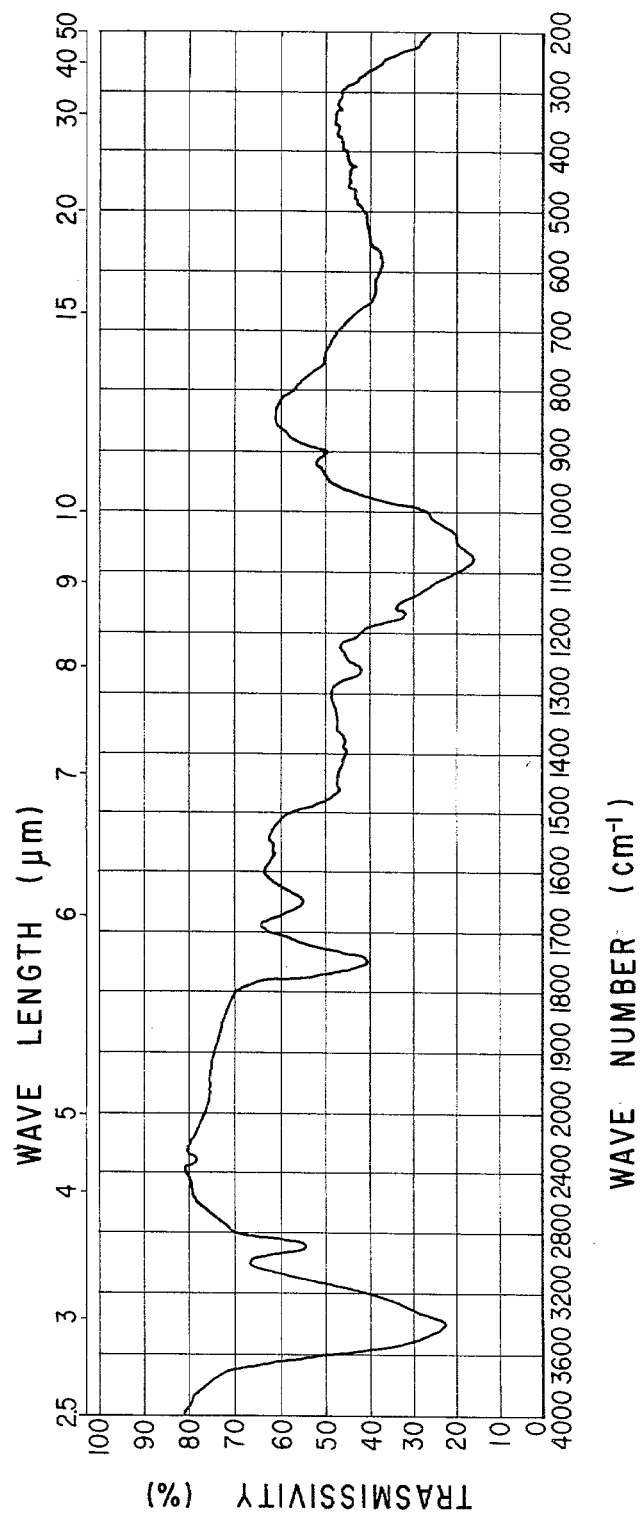

The results of infrared absorption spectroscopy of the product were: absorption bands at 3400, 2900, 1730, 1460–1320, 1070 and 890 cm$^{-1}$ as are shown in FIG. 2.

The results of proton nuclear magnetic resonance spectroscopy were: the resonance peaks at 1.0, 2.0, 4.56 and 5.46 ppm.

According to the above-mentioned results of analyses, the white powdery product was identified as poly(1-O-methacroyl-D-celloboise). It was soluble in water, dimethylformamide and dimethylsulfoxide and insoluble in ordinary organic solvents.

EXAMPLE 3

(a) Production of poly(1'-O-methacroyl-2',3',6',2,3,4,6-heptaacetylcellobiose).

Poly(methacrylic acid) of a degree of polymerization of about 100 (5.4 g) and 23.6 g of 3,4,6-tri-O-acetyl-α-glucose 1,2-orthoacetate were dissolved in 50 ml of chlorobenzene and the solution was heated under reflux for one hour. After the reaction was over, the reaction mixture was poured into 500 ml of methanol and the thus separated substance was collected by centrifugation, washed with methanol and dried under reduced pressure to obtain 23.0 g of a white powder (yield of 88% by weight).

(b) Production of poly(1-O-methacroyl-D-cellobiose).

Twenty grams of the above-mentioned white powder were suspended in 150 ml of methanol, and 40 ml of a 1.6% methanolic solution of sodium methylate were added to the solution. The mixture was stirred for 4 hours at the room temperature.

After the reaction was over, 200 ml of water were added to the reaction mixture just followed by neutralization with a dilute aqueous solution of hydrochloric acid and the neutralizate was dialized in a dialysis tube (DC-210, made by Union Carbide Co.).

Then the content of the tube was condensed to about 30 ml, and 300 ml of methanol were added to the condensate. The thus deposited white precipitate was collected by centrifugation, washed repeatedly with methanol and dried under reduced pressure to obtain 9.0 g of a white powder (yield of 76% by weight) showing no definite melting point. Its intrinsic viscosity was 7.8.

The results of elementary analysis were: Found: Carbon of 46.8% by weight and Hydrogen of 6.1% by weight, Calcd: Carbon of 46.9% by weight and Hydrogen of 6.1% by weight.

The results of infrared absorption spectroscopy and of proton nuclear magnetic resonance spectroscopy were the same as in Example 2, with peaks in the same positions. Accordingly the product was identified as poly(1-O-methacroyl-D-cellobiose). The product was soluble in water, dimethylformamide and dimethylsulfoxide and not soluble in ordinary organic solvents.

EXAMPLE 4

Instead of acetobromocellobiose in Example 2, using acetobromo derivatives of mannose, fructose, lactose and maltose, respectively, and further, instead of silver methacrylate in Example 2, using silver acrylate, each synthesis was carried out in the manner as in Example 2 to obtain each white powder. According to the results of elementary analysis, infrared absorption spectroscopy and nuclear magnetic resonance spectroscopy, each product was identified, as shown in Table 1, as poly(1-O-acroyl-D-mannose), poly(1-O-acroyl-D-fructose), poly(1-O-acroyl-D-lactose) and poly(1-O-acroyl-D-maltose) in the above-mentioned order of saccharides.

EXAMPLE 5

Instead of 3,4,6-tri-O-acetyl-α-glucose 1,2-ethylorthoacetate in Example 1, 1,2-ethylorthoacetates of 3,4,6-tri-O-acetyl-α-mannose and 3,4,5-tri-O-acetyl-D-fructose, and 1',2'-ethylorthoacetates of 2,3,4,6,3',6'-hexa-O-acetyl-α-lactose and 2,3,4,6,3',6'-hexa-O-acetyl-α-maltose are used, respectively, to carry out the same type of preparation as in Example 1. Each reaction gave each white powder. According to the results of elementary analysis, infrared spectroscopy and nuclear magnetic resonance spectroscopy performed on each product, they were identified, as are shown in Table 2, as poly(1-O-methacroyl-D-mannose), poly(1-O-methacroyl-D-fructose), poly(1-O-methacroyl-D-lactose) and poly(1-O-methacroyl-D-maltose), respectively in the above-mentioned order of reactants.

TABLE 1

| | Elementary analytical values (wt %) C | H | [η] | Confirmed structural formula | Yield % by weight (from monomer) | Solubility | Presence of IR absorption bands |||||| 
|---|---|---|---|---|---|---|---|---|---|---|---|---|
| | | | | | | | cm⁻¹ 3400 | cm⁻¹ 2900 | cm⁻¹ 1730 | cm⁻¹ 1260 | cm⁻¹ 1170 | cm⁻¹ 1000–1100 |
| Poly(1-O-acroyl-D-mannose) | 45.5 | 6.7 | 5.2 | (structure) | 65.0 | Soluble in water, DMF and DMSO | yes | yes | yes | yes | yes | yes |
| Poly(1-O-acroyl-D-lactose) | 45.0 | 6.5 | 7.8 | (structure) | 70.5 | Soluble in water, DMF and DMSO | " | " | " | " | " | " |
| Poly(1-O-acroyl-D-fructose) | 45.9 | 6.0 | 4.8 | (structure) | 54.2 | Soluble in water, DMF and DMSO | " | " | " | " | " | " |
| Poly(1-O-acroyl-D-maltose) | 45.1 | 6.5 | 4.5 | (structure) | 68.8 | Soluble in water, DMF and DMSO | " | " | " | " | " | " |

TABLE 2

| | Elementary analytical values (wt %) C | H | [η] | Confirmed structural formula | Yield % by weight (from monomer) | Solubility | Presence of IR absorption bands |||||| 
|---|---|---|---|---|---|---|---|---|---|---|---|---|
| | | | | | | | cm⁻¹ 3400 | cm⁻¹ 2700 | cm⁻¹ 1730 | cm⁻¹ 1260 | cm⁻¹ 1170 | cm⁻¹ 1000–1100 |
| Poly(1-O-methacroyl-D-mannose) | 48.1 | 6.1 | 5.5 | (structure) | 63.2 | Soluble in water, DMF and DMSO | yes | yes | yes | yes | yes | yes |
| Poly(1-O-methacroyl-D-fructose) | 48.2 | 6.42 | 6.2 | (structure) | 54.7 | Soluble in water, DMF and DMSO | " | " | " | " | " | " |

TABLE 2-continued

| | Elementary analytical values (wt %) | | | Confirmed structural formula | Yield % by weight (from monomer) | Solubility | Presence of IR absorption bands | | | | | |
|---|---|---|---|---|---|---|---|---|---|---|---|---|
| | C | H | [η] | | | | $cm^{-1}$ 3400 | $cm^{-1}$ 2700 | $cm^{-1}$ 1730 | $cm^{-1}$ 1260 | $cm^{-1}$ 1170 | $cm^{-1}$ 1000–1100 |
| Poly(1-O-methacroyl-D-lactose) | 46.4 | 6.1 | 6.8 | (structure) | 71.1 | Soluble in water, DMF and DMSO | " | " | " | " | " | " |
| Poly(1-O-methacroyl-D-maltose) | 46.9 | 6.1 | 4.4 | (structure) | 68.3 | Soluble in water, DMF and DMSO | " | " | " | " | " | " |

EXAMPLE 6

Experiments on laboratory animals.

Dorsal part of each guinea pig was depilated by hair clippers and the part was abraded by a sandpaper and then 0.2 ml of an aqueous suspension of the spores ($1 \times 10^9$ spores/ml) of *Tricophyton mentagrophytes* cultured for 14 days was painted on that part. From the 5th day of the inoculation, 0.5 ml of each ointment prepared as shown in Table 3 was applied on the diseased part as indicated in Table 3 to observe the redness, the exsudative change, the crust formation and the regeneration of the hairs. The observation was performed on each 10 animals on the 20th day after inoculation. The results are shown in Table 4. As is seen in Table 4, the usefulness of the high polymeric substance having saccharide side chains of the present invention was remarkable.

TABLE 3

| Recipe of Dermal Drugs | | |
|---|---|---|
| Recipe A: | Emulsion of undecylenic acid (emulsified into distilled water at 1% by weight) | |
| Recipe B-1: | Emulsion of undecylenic acid + Poly(1-O-methacroyl-D-lactose) | 1% |
| Recipe B-2: | Emulsion of undecylenic acid + Poly(1-O-methacroyl-D-mannose) | 1% |
| Recipe B-3: | Emulsion of undecylenic acid + Poly(1-O-methacroyl-D-fructose) | 1% |
| Recipe B-4: | Emulsion of undecylenic acid + Poly(1-O-methacroyl-D-maltose) | 1% |
| Recipe B-5: | Emulsion of undecylenic acid + Poly(1-O-acroyl-D-mannose) | 1% |
| Recipe B-6: | Emulsion of undecylenic acid + Poly(1-O-acroyl-D-fructose) | 1% |
| Recipe B-7: | Emulsion of undecylenic acid + Poly(1-O-acroyl-D-maltose) | 1% |
| Recipe B-8: | Emulsion of undecylenic acid + Poly(1-O-methacroyl-D-glucose) | 1% |
| Recipe B-9: | Emulsion of undecylenic acid + Poly(1-O-acroyl-D-glucose) | 1% |
| Recipe B-10: | Emulsion of undecylenic acid + Poly(1-O-acroyl-D-lactose) | 1% |
| Recipe B-11: | Emulsion of undecylenic acid + Poly(1-O-methacroyl-D-cellobiose) | 1% |
| Recipe B-12: | Emulsion of undecylenic acid + Poly(1-O-acroyl-D-cellobiose) | 1% |

Time of dermal application:

Recipe A: Once a day, for consecutive 10 days from the 5th day of inoculation. 10 times in total.
Recipe B: Once on the 5th, 8th and 13th days after inoculation. 3 times in total.

TABLE 4

| | Results | | | |
|---|---|---|---|---|
| | Evaluation | | | |
| Recipe | Remarkably effective | Effective | Ineffective | Total |
| Recipe A | 2/10 | 2/10 | 6/10 | 10/10 |
| Recipe B-1 | 4/10 | 4/10 | 2/10 | " |
| Recipe B-2 | 4/10 | 5/10 | 1/10 | " |
| Recipe B-3 | 3/10 | 5/10 | 2/10 | " |
| Recipe B-4 | 5/10 | 3/10 | 2/10 | " |
| Recipe B-5 | 4/10 | 4/10 | 2/10 | " |
| Recipe B-6 | 3/10 | 4/10 | 3/10 | " |
| Recipe B-7 | 4/10 | 4/10 | 2/10 | " |
| Recipe B-8 | 4/10 | 5/10 | 1/10 | " |
| Recipe B-9 | 4/10 | 4/10 | 2/10 | " |
| Recipe B-10 | 3/10 | 5/10 | 2/10 | " |
| Recipe B-11 | 3/10 | 5/10 | 2/10 | " |
| Recipe B-12 | 4/10 | 4/10 | 2/10 | " |

Note: Figures show the number of animals.

Criteria for evaluation of the effectiveness:

Remarkably effective: Without redness and exsudative change; slight formation of the crust; and favorable regeneration of hairs.

Effective: Without exsudative change; formation of the crust; and incomplete regeneration of hairs.

Ineffective: Exsudative change observed; and conspicuous redness.

What is claimed is:

1. A high polymeric substance having saccharide side chains represented by the formula

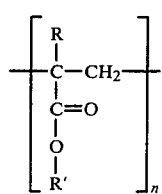

wherein R represents a hydrogen atom or a methyl group and R' represents a residue of a saccharide selected from the group consisting of glucose, fructose, maltose, mannose, lactose and cellobiose, which is acyl-bonded at its 1-position, and n is an integer of 10 to 1000.

* * * * *

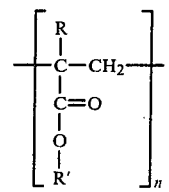

wherein R represents a hydrogen atom or a methyl group and R' represents a residue of a saccharide selected from the group consisting of glucose, fructose, maltose, mannose, lactose and cellobiose, which is acyl-bonded at its 1-position, and n is an integer of 10 to 1000.

* * * * *